United States Patent [19]
Javidi et al.

[11] Patent Number: 5,367,579
[45] Date of Patent: Nov. 22, 1994

[54] METHOD OF REMOVING SPURIOUS RESPONSES FROM OPTICAL JOINT TRANSFORM CORRELATORS

[75] Inventors: Bahram Javidi; Qing Tang, both of Storrs, Conn.

[73] Assignee: The United States of America as represented by the Secretary of the Air Force, Washington, D.C.

[21] Appl. No.: 83,152

[22] Filed: Jun. 25, 1993

[51] Int. Cl.$^5$ .............................................. G06K 9/76
[52] U.S. Cl. ...................................... 382/31; 382/42; 359/561
[58] Field of Search ............................ 382/31, 42, 43; 359/559, 561; 364/822; 250/550

[56] References Cited

U.S. PATENT DOCUMENTS

| | | | |
|---|---|---|---|
| 4,084,255 | 4/1978 | Casasent et al. | 364/822 |
| 4,204,262 | 5/1980 | Fitelson et al. | 364/822 |
| 4,723,125 | 2/1988 | Elleaume | 342/194 |
| 4,826,285 | 5/1989 | Horner | 359/561 |
| 4,831,598 | 5/1989 | Koike et al. | 367/7 |
| 4,832,447 | 5/1989 | Javidi | 359/561 |
| 4,922,256 | 5/1990 | Brandstetter | 342/132 |
| 5,119,443 | 6/1992 | Javidi et al. | 382/42 |

OTHER PUBLICATIONS

Tang & Javidi, "Technique for reducing the redundant and self-correlation terms in joint transform correlators", Applied Optics, 10 Apr. 1993, vol. 32, No. 11, pp. 1911–1918.

*Primary Examiner*—Yon J. Couso
*Attorney, Agent, or Firm*—Robert L. Nathans; Stanton E. Collier; Jacob N. Erlich

[57] ABSTRACT

A joint transform optical correlator is disclosed having an optical path length adjustment technique for causing a first optical path length between the reference image plane and the first Fourier transform lens to differ from a second optical path length between the input image plane and the first Fourier transform lens by an amount whereby the second Fourier transform lens separates the desired cross-correlation signals from the undesired signals to enhance the performance and reliability of the correlator.

22 Claims, 1 Drawing Sheet

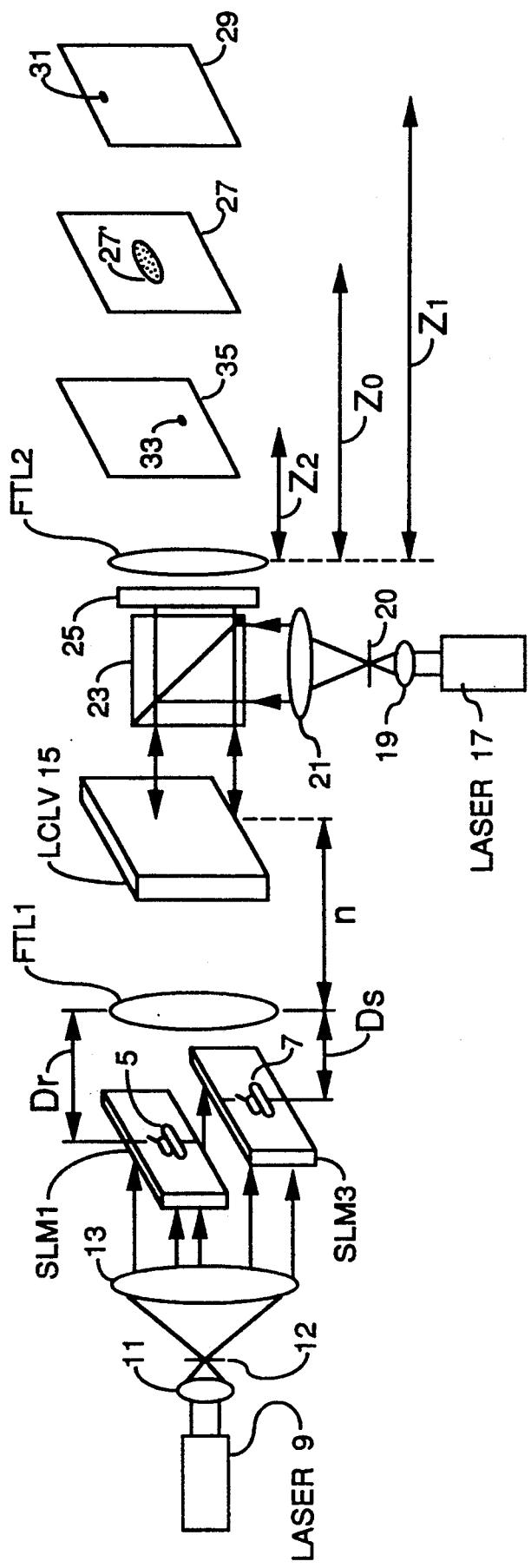
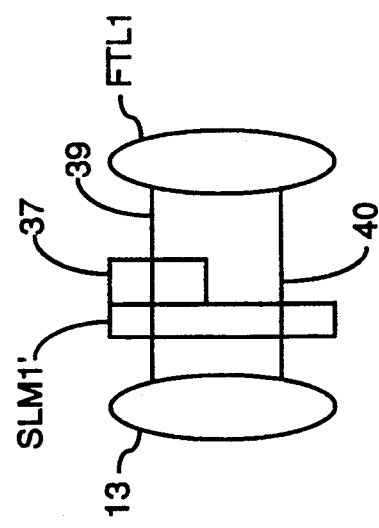
FIG. 1
FIG. 2

METHOD OF REMOVING SPURIOUS RESPONSES FROM OPTICAL JOINT TRANSFORM CORRELATORS

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of optical correlators and more particularly to joint transform correlators.

In a conventional joint transform correlator (JTC), the input signal to be identified, often a two dimensional image of a scene, and the reference signal to be compared to the input signal, are displayed in the same plane. The output of the JTC contains three terms. One is the sum of the autocorrelation of the input scene and the auto-correlation of the reference signal that is formed on the optical axis (DC terms). The other two terms are the cross-correlation functions between the input signal and the reference signal that are diffracted off-axis. These two cross-correlation terms are positioned away from the optical axis and are symmetrical thereto. Either one indicates the presence and the locations of identified input targets. Conventional JTC are well known in the art. U.S. Pat. No. 4,695,973, issued to Francis T.S. Yu, describes a JTC having structure quite similar to the embodiments of the present invention. U.S. Pat. No. 4,832,447 issued to Bahram Javidi describes a JTC which employs a non-linear spatial light modulator (SLM) at the Fourier plane and which can be advantageously used in implementing the present invention.

Ideally a correlation peak would occur in the JTC output plane only at the location of each target in the input scene. However, if there are multiple targets in the input scene, it is well known that spurious correlation signals can be generated among these multiple targets themselves, each correlating with one another. One example of this is a scene with many prominent repetitions of a feature, such as a picture of a house with a picket fence. This causes false alarms and degrades the performance and reliability of the JTC.

BRIEF SUMMARY OF THE INVENTION

The present invention eliminates the aforesaid problem posed by the spurious correlation signals by causing the optical path length between the reference image plane and the Fourier transform lens to differ from the optical path length between the input image plane and the Fourier transform lens. The optical path difference is such as to encode the joint power spectrum with a different quadratic phase function or chirp function, for each correlation term. As a result, the JTC has three output planes. The auto-correlation functions on the optical axis (DC terms) are focused on one of the output planes, and the off axis cross-correlation functions are produced in two other separate output planes. Due to the formation of this chirp modulation, we call this technique chirp encoding of a JTC.

In one embodiment, the reference image plane is physically displaced along the optical axis relative to the input image plane. In a second embodiment, both images lie in the same plane so that a single spatial light modulator (SLM) can be used and a rectangular block of glass is positioned in front of the reference image or the input image to create the desired optical path length difference. This technique can be applied to both linear and nonlinear JTC.

BRIEF DESCRIPTION OF THE DRAWINGS

Various features and advantages of the present invention will become more apparent upon study of the following description, taken in conjunction with the drawings in which: FIG. 1 illustrates a first embodiment of the invention; and FIG. 2 illustrates a second embodiment of the invention for changing the optical path lengths between the two images being correlated and the first Fourier transform lens.

DETAILED DESCRIPTION OF PREFERRED EMBODIMENTS OF THE INVENTION

Referring now to FIG. 1, a joint image production means comprises a first SLM 1 having a reference image 5 stored therein and a second SLM 3 having an input image 7 stored therein. While SLMs are preferred, generally speaking images or their binary versions or non-linearly transformed versions can be displayed not only on an SLM but also on photographic film or on any optical or opto-electronic input-output device. SLM 1 is in the reference plane that contains the reference signal $r(x+x_o,y)$, or multiple reference signals, and is positioned a distance Dr from the transform lens FTL1 as indicated. SLM 3 is in the input plane that contains the input scene $s(x-x_o,y)$ and is positioned a distance Ds from the transform lens. XO is a constant which is added to the position of one input image and subtracted from the position of the other input image. The result is an appropriate displacement of the joint JTC input images 5 and 7 with respect to each other and as shown in FIG. 1. The input scene, that may contain multiple targets, and the reference image or their binary versions or nonlinearly transformed versions can be displayed on transparencies or the more practical SLMs. A coherent light beam is generated by laser 9 and illuminates both input SLMs with collimated light via lenses 11 and 13 and spatial filter 12. A first Fourier transform lens means FTL1 produces an interference pattern between Fourier transforms of the reference image 5 and the input image 7, which interference pattern is inputted into an image energy detector 15, which can be a square law detector such as an SLM or CCD camera or can comprise a liquid crystal light valve (LCLV). See W.P. Bleha et al., "Application of the liquid crystal light valve to real-time optical data processing", Opt. Eng., 17, 371–384 (1978). The output from LCLV 15 is a light pattern comprising a Fourier transform interference intensity signal which is called a joint power spectrum (JPS). The JPS is read out of LCLV 15 and is inverse Fourier transformed by Fourier transform lens device FTL2. LCLV 15 is optically read out by directing a coherent, collimated light beam at the LCLV via laser 17, lenses 19 and 21, spatial filter 20, and beamsplitter 23. The signal retrieved from LCLV 15 passes through the right hand portion of the beamsplitter, through polarizer 25 and is Fourier transformed by FTL2 to produce the cross-correlation peaks 33 and 31 in separate planes 35 and 29 positioned on either side of central positioned plane 27. The centrally positioned plane 27 contains the auto-correlation or DC terms which are of lesser interest for this device.

This highly desired goal of thus separating the spurious signals from the desired signals is effected by causing the first optical path length Dr to differ from the second optical path length Ds by an amount whereby FTL2 focuses a first off-axis cross-correlation peak 33 in plane 35 and focuses a second off-axis cross-correlation peak 31 in plane 29 separated from plane 35 as shown. Path length Dr is the distance between SLM 1 containing the reference signal and FTL1 whereas path length Ds is the distance between SLM 3 containing the input signal and FTL1 as indicated in FIG. 1.

The first cross correlation term $s(x',y')$ $r^*(x',y')$ where indicates correlation and* indicates complex conjugate, is obtained in the plane 29 which is a distance $z_1$ away from the transform lens $FTL_2$:

$$z_1 = \frac{f^2}{f - (d_r - d_s)} \cdot \quad (1)$$

The other cross-correlation term $s^*(x',y')$ $r(x',y')$ is produced in plane 35 to the right of the lens $FTL_2$ which is a distance z2 away from the transform lens $FTL_2$:

$$z_2 = \frac{f^2}{f + (d_r - d_s)} \cdot \quad (2)$$

The term f in equations (1) and (2) denotes the focal length of the transform lens FTL2. The autocorrelation functions produced by the self product terms of the joint power spectrum $[s(x',y')\ s^*(x',y') + r(x',y')\ r^*(x',y')]$ are obtained at the back focal plane of the Fourier transform lens $FTL_2$, and are separated along the optical axis from the cross-correlation functions produced by the cross-product terms of the joint power spectrum $[s^*(x',y')\ r(x',y')$ and $s(x',y')\ r^*(x',y')]$. At the output plane $P_z$, positioned $z = z_1$ [see Eq. (1)] from the lens $FTL_2$, the correlation signal $s(x',y')$ $r^*(x',y')$ is obtained. The other terms $[s(x',y')\ s^*(x',y')$, $r(x',y')\ r^*(x',y')$ and $s^*(x',y')\ r(x',y')]$ are out of focus on this plane due to the non-zero quadratic phase modulation of the spectrum. Their corresponding correlation signal intensities are relatively small compared to that of the desire correlation signal $s(x',y')$ $r^*(x',y')$.

Nonlinear transformation can be applied to the joint power spectrum to obtain a nonlinear JTC. This nonlinear transformation of the joint power spectrum results in an improved correlation performance in each output plane. It sharpens the correlation peaks of interest, and spreads out the diffused correlation signal functions. See U.S. Pat. No. 4,832,4217 to Javidi, entitled JOINT TRANSFORM IMAGE CORRELATOR USING A NONLINEAR SPATIAL LIGHT MODULATOR AT THE FOURIER PLANE. Thus the optical or optoelectronic input-output device positioned at the back focal plane of the lens FTL1 can be operated in a nonlinear fashion in accordance with the techniques of the '477 patent'.

The apparatus of FIG. 1 was tested successfully and provided the desired results described above. Laser 9 was an argon-ion laser having a wavelength of 514 nm. The sizes of the two images were about 1 mm×2.5 mm and 2 mm×4 mm. The separation between images was 4 mm and the separation between the input planes containing the images was 20 mm. FTL1 had a focal length of 1000 mm Readout beam laser 17 was a He—Ne laser producing a beam having a wavelength of 633 nm. The intensity of the readout beam was about 25 microwatts/sq. cm., over the LCLV aperture of 25 mm×25 mm. FTL2 had a focal length of 400 mm. The correlation outputs are detected with a CCD camera interfaced with a computer, and viewed with a video monitor. The CCD camera is placed on a translator to detect the correlation functions formed in the different output planes 27, 29 and 35 of FIG. 1.

Particularly in view of these parameters, the skilled worker in the art can readily construct the improved JTC of the present invention. Thus in the interest of brevity and economy, the extended mathematical analysis of the present invention has been omitted. However, said extensive mathematical analysis is presented in "Technique for Reducing the Redundant and Self-Correlation terms in Joint Transform Correlators"; Tang and Javidi, Applied Optics, Apr. 10 1993, Vol. 32, No. 11, pages 1911–1918.

One of the important advantages of this technique is in multiple objects detection using a JTC. In a conventional JTC, given an input scene with multiple targets, the output plane contains the desired cross-correlation between the reference signal and the input scene, and the undesired correlations between the targets in the input scene. Using this technique, the desired correlation signals between the reference signal and the input targets, and the undesired correlations between the target in the input scene are produced in separate output planes. In one of the output planes, the cross-correlations between the reference image and the input targets are generated. In this plane, the cross-correlation terms between the different targets in the input scene, and the autocorrelation terms for different targets are out of focus due to the quadratic phase modulation in the Fourier plane. As a result, the effect of the intermodulation of the similar targets in the input scene is reduced. In addition, the separation requirement between the input scene and the reference signal may be relaxed. Multiple objects detection was also tested successfully. In the test, the input scene contains three identical tank images. The size of the single tank image is approximately 1 mm×2.5 mm and the separation between two conjunct images is 1.6 mm. The reference signal is a single tank image with the size 1 mm×2.5 mm. At the output plane of the system, three correlation peaks corresponding to the cross-correlations of the reference image and the multiple targets in the input scene are obtained, and the inter-correlations between the targets are suppressed.

In a second embodiment of the invention, the image input planes are coplanar rather than being displaced from each other along the optical axis as shown in FIG. 1. Thus, a single SLM 1' can be used if desired rather than two SLMs as shown in FIG. 1. A block of glass 37 can be inserted against the reference object $r(x+x_o,y)$ in SLM 1' and into the upper optical path 39 as shown in FIG. 2, and as a result, the optical path lengths Dr and Ds are still different as required by the present invention. As understood by workers in the art, the optical path length equals the geometric path length multiplied by the index of refraction n of the medium through which the light is passing. See "Introduction to Classical and Modern Optics", page 10, Jurgen R. Meyer-Arerndt, Prentice-Hall, 1984. Thus, the optical path length of the upper path 39 which includes the block of glass 37 having an index of refraction greater than one, will be greater than the optical path length of the lower path 40 through air only. In our experimental setup, the thickness of the glass block 37 was 45 mm. and had an index of refraction of 1.6. This setup is equivalent to the FIG. 1 embodiment with the SLMs separated along the optical axis by 17 mm. At output plane 29, the desired cross-correlation peak is obtained.

The "Applied Optics" paper, incorporated by reference herein, also describes computer simulations of the present invention showing the aforesaid beneficial results.

Since other embodiments of the invention will become apparent to the skilled workers in the art, the scope of the invention is to be limited only by the terms in the following claims and art recognized equivalents thereof. For example, the SLMs can be replaced by other optical or electro-optical input/output devices. Likewise with respect to the LCLV which could be replaced by optically or electrically addressed SLMs.

We claim:

1. A joint transform correlator for producing a plurality of joint transform image cross-correlation signals comprising:
   (a) joint image production means for producing a joint image of a reference image at a reference image plane and an input image at an input image plane;
   (b) first Fourier transform means for producing an interference pattern between Fourier transforms of said reference image and said input image;
   (c) detector means for detecting said interference pattern and for outputting a Fourier transform interference intensity distribution signal;
   (d) a second Fourier transform means for inverse Fourier transforming said interference intensity distribution signal;
   (e) and further including optical path length adjustment means for causing a first optical path length between said reference image plane and said first Fourier transform means to differ from a second optical path length between said input image plane and said first Fourier transform means by an amount whereby said second Fourier transform means produces a first off-axis cross-correlation function signal in a first plane and a second off-axis cross-correlation function signal in a second plane separated from said first plane.

2. The correlator of claim 1 wherein said optical path length adjustment means comprises a single transparent optical element having an index of refraction greater than one and positioned to intercept light from only one image produced by said joint image production means.

3. The correlator of claim 2 wherein said transparent optical element comprises a rectangular block.

4. The correlator of claim 1 wherein said detector means comprises a nonlinear liquid crystal light valve.

5. The correlator of claim 2 wherein said detector means comprises a nonlinear liquid crystal light valve.

6. The correlator of claim 3 wherein said detector means comprises a nonlinear liquid crystal light valve.

7. A joint transform correlator for producing a plurality of joint transform image cross-correlation signals comprising:
   (a) joint image production means for producing a joint image of a reference image at a reference input plane and an input image at an input image plane;
   (b) a first Fourier transform lens means for producing an interference pattern between Fourier transforms of said reference image and said input image;
   (c) an image energy detector located at a Fourier plane for receiving said interference pattern and for outputting a light pattern comprising a Fourier transform interference intensity signal;
   (d) a second Fourier transform lens means for receiving said light pattern from said image energy detector and for inverse Fourier transforming said light pattern;
   (e) and further including optical path length adjustment means for causing a first optical path length between a reference image plane and said first Fourier transform lens means to differ from a second optical path length between an input image plane and said first Fourier transform lens means by an amount whereby said second Fourier transform lens means focuses a first off-axis cross-correlation function signal in a first plane and a second off-axis cross-correlation function signal in a second plane separated from said first plane.

8. The correlator of claim 7 wherein said optical path length adjustment means comprises a single transparent optical element having an index of refraction greater than one and positioned to intercept light from only one image produced by said joint image production means.

9. The correlator of claim 8 wherein said transparent optical element comprises a rectangular block.

10. The correlator of claim 7 wherein said energy detector comprises a nonlinear liquid crystal light valve.

11. The correlator of claim 8 wherein said energy detector comprises a nonlinear liquid crystal light valve.

12. The correlator of claim 9 wherein said energy detector comprises a nonlinear liquid crystal light valve.

13. A joint transform correlator for producing a plurality of joint transform image cross-correlation signals comprising:
   (a) joint image production means for producing a joint image of a reference image at a reference input plane and an input image at an input image plane;
   (b) a first Fourier transform lens means for producing an interference pattern between Fourier transforms of said reference image and said input image;
   (c) a nonlinear thresholded image detector for receiving said interference pattern and for outputting a binary Fourier transform interference intensity distribution signal;
   (d) a second Fourier transform lens means for inverse Fourier transforming said binary Fourier transform interference intensity distribution signal;
   (e) and further including optical path length adjustment means for causing a first optical path length between a reference image plane and said first Fourier transform lens means to differ from a second optical path length between an input image plane and said first Fourier transform lens means by an amount whereby said second Fourier transform lens means focuses a first off-axis cross-correlation peak signal in a first plane and a second off-axis cross-correlation peak signal in a second plane separated from said first plane.

14. The correlator of claim 13 wherein said optical path length adjustment means comprises a single transparent optical element having an index of refraction greater than one and positioned to intercept light from only one image produced by said joint image production means.

15. The correlator of claim 14 wherein said transparent optical element comprises a rectangular block.

16. The correlator of claim 13 wherein said nonlinear thresholded image detector comprises a nonlinear liquid crystal light valve.

17. The correlator of claim 14 wherein said nonlinear thresholded image detector comprises a nonlinear liquid crystal light valve.

18. The correlator of claim 15 wherein said nonlinear threshold image detector comprises a nonlinear liquid crystal light valve.

19. The correlator of claim 2 wherein said joint image production means comprises a single spatial light modulator.

20. The correlator of claim 3 wherein said joint image production means comprises a single spatial light modulator.

21. The correlator of claim 14 wherein said joint image production means comprises a single spatial light modulator.

22. The correlator of claim 15 wherein said joint image production means comprises a single spatial light modulator.

* * * * *